June 16, 1953  J. W. BATES  2,642,518
DUAL LIGHT SOURCE FOR CAMERAS
Filed Dec. 21, 1950
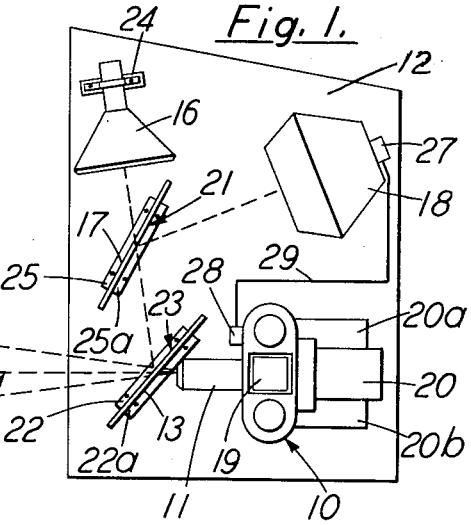
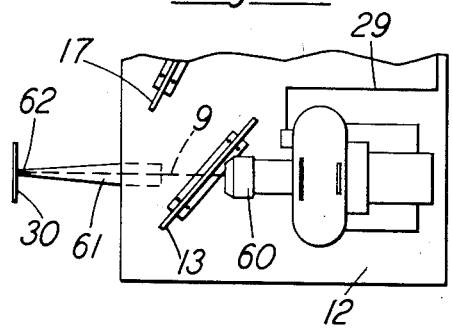
Inventor
Jackson W. Bates
BY
Attorney Patented June 16, 1953

2,642,518

UNITED STATES PATENT OFFICE 2,642,518

DUAL LIGHT SOURCE FOR CAMERAS

Jackson W. Bates, Ovid, Mich.

Application December 21, 1950, Serial No. 202,105

5 Claims. (Cl. 240—2)

This invention relates, in general, to a photographic unit having self-contained illumination, and more specifically to a type thereof having means for supporting a camera and means for directing, in the form of a beam, radiation both from an intense and a weak source of illumination onto an object to be photographed. Portions of each of said beams of light are parallel with the line of sight through the optical system of said camera to the said object.

It is a recognized fact that light is necessary to expose normal photographic film. In the absence of daylight, such exposure is accomplished with artificial illumination. Under the latter conditions, and especially where flash-type illumination is used, it is necessary to have an auxiliary light souce of relatively weak intensity which can be directed upon the object to be photographed in order to locate the object in the view finder of the camera prior to exposure of the film therein. Present methods and means for handling such an auxiliary light source and directing its radiation during the location of the object in said view finder have been very unsatisfactory.

Accordingly, a primary object of this invention is the provision of a photographic unit, including means supporting a camera and means directing beams of radiation both from an intense and a weak source of illumination onto an object to be photographed by said camera, portions of said beams being coincident with the line of sight through the optical system of said camera to the said object. The weak source of illumination is operative continuously to permit sighting of the optical system upon the object to be photographed.

Another object of this invention is to provide a photographic unit, as aforesaid, having an intense source of illumination, independent of said weak source, and means for directing light radiation therefrom in a beam parallel with, and entirely surrounding, the extended axis of the lens system of a camera, whereby an object to be photographed will be properly illuminated by said intense source, when the camera shutter is opened, if said object is substantially in the beam from the weak source of illumination.

Other objects of the invention will become apparent to those familiar with this type of equipment upon reading the following description and examining the accompanying drawings.

In the drawings:

Figure 1 is a plan view of my photographic unit.

Figure 2 is an oblique view of the elements of said photographic unit in their relative positions.

Figure 3 is an oblique, somewhat schematic view showing the paths of the two light beams.

Figure 4 is a fragmentary plan view of my photographing unit equipped with a focusing probe.

For the purpose of convenience in description, and without intending any limitation upon the scope of my invention, the term "lens axis," as used herein, shall have reference to an imaginary line passing through the center of the lens in the optical system 11 of the camera 10 and the focal point thereof. The terms "rearwardly" and "forwardly" shall be used in referring to the parts of the unit positioned, respectively, toward the right and left sides thereof as shown in Figure 1.

In meeting the above outlined objects, as well as others incidental thereto, I have provided a camera 10, having an optical system 11, mounted upon a support base 12. A mirror 13, having a central opening 14 (Figure 2) through which the lens axis, shown by broken line 9, extends, is disposed at an angle to said lens axis. The central opening 14 is trapezoidal in shape with the two nonparallel sides forming the top and bottom of the opening. The larger base of the trapezoid is on the side away from the constant light source 16. The trapezoidal shape is necessary because the mirror 13 is at an angle to the lens axis. The mirror 13 has a reflecting surface 23 only on its forward face, the rearward face having a non-reflective surface. A constant source 16 of weak illumination is secured to said support base 12 and is positioned for directing light radiation upon the mirror 13. A second mirror 17 is disposed in the path of the light radiation passing from the constant source 16 to the mirror 13. The reflective surface 21 of the second mirror 17 is confined to a circular area substantially smaller than the diameter of the light beam emanating from the constant light source 16. Except for the reflective surface 21, the second mirror 17 is pervious to light. Any one of numerous light pervious materials may be satisfactorily used for the second mirror 17. A flash source 18 of intense illumination is secured to said base 12 and positioned to direct its light radiation upon the reflective surface 21 of said second mirror 17, whereupon it is reflected onto the first mirror 13. The mirrors 13 and 17, and the light sources 16 and 18 are so disposed that those portions of the radiation from both sources passing between the two mirrors will be substantially coaxial. The camera 10 is disposed so that the lens axis 9 thereof will be coaxial with, and surrounded by, those portions of radiation from both sources 16 and 18 reflected by the mirror 13.

The support base 12, may be made of any suitable light weight material, such as plywood, which has sufficient strength to rigidly hold the various elements of the unit when mounted thereon, and may be made of any convenient size or shape. As shown in Figure 1, the support base 12 is substantially rectangular in shape.

The camera 10, which is mounted at the rearward end, and adjacent one side of, the support base 12 (Figure 1), is equipped with a conventional synchronizing device 28 for actuating the flash source 18, when the shutter is tripped. The camera 10 is secured to a block 20, which block is slidably mounted upon the support base 12 for rearward and forward movement between the guides 20a and 20b, and is positioned with the lens axis 9 parallel to the plane of the support base 12. The purpose of making the camera movable upon its base is to permit the camera to be adjusted relative to the mirror 13. This adjustment is necessary only when the length of the optical system 11 is changed. The end of the lens always remains adjacent the mirror 13.

The camera 10 is of the single lens, reflex type, equipped with a focal plane shutter. Since my invention is designed for taking photographs at close range, it is essential in checking focus that there be no parallax. This can only be accomplished, without auxiliary aids, with cameras of the single lens, reflex type. The viewing glass is indicated by the numeral 19.

Where, however, it is necessary to use a camera other than the single lens, reflex type, the camera is equipped with an auxiliary copying lens 60. In addition, a finger or probe 61 is mounted on the base 12 parallel to the lens axis 9. The end 62 of this probe is so spaced from the optical system 11, that an object contacting this end 62 will be in focus. This probe 61 does not determine the area to be photographed but merely the point of focus.

The constant light source 16, is an incandescent lamp of the prefocused type, transmitting a converging beam of diffused light. The shape of the beam 40 emanating from the constant light source 16 is that of a hollow cone. Thus, this beam 40 of light passes around the reflective surface 21 and forms the ring on the mirror 17 between the circle 50 and the reflective surface 21. Thus, the reflective surface 21 intercepts only a very minute portion of the light of the beam 40. The constant light source 16 is secured to said support base by means of the clamp 24. The light 16 is positioned opposite to and is spaced from the reflective surface 23 of the mirror 13, and is disposed for directing light radiation upon said reflective surface 23. Since the reflective surface 23 intercepts the beam 40 between the light source 16 and the focal point of the beam 40, the beam 40 forms an annular ring 51 on the reflective surface 23 surrounding the central opening 14 (Figure 3). The strength of the constant light source 16 is such that using its light alone, without the mirror 17 in place, an exposure of 1/25 of a second on conventional color film may be made of an object spaced approximately 8 inches from the reflective surface 23 at a setting of f-11 without the use of additional light from any source. The flash source 18 is designed for use when exposures of 1/100 of a second or less are desired. The desirability of taking exposures by means of the light from the constant source 16 only, lies in the rapidity with which a number of exposures may be made without the delay necessitated by changing flash bulbs.

The mirror 17 is secured to the support base 12, in a plane perpendicular thereto, in the path of the light radiation passing from the constant light source 16 to the reflective surface 23, by wooden blocks 25 and 25a, and is disposed at an angle with respect to the plane of said first mirror 13 which will be described in more detail hereinafter. The reflective surface 21 of the mirror 17 is faced away from the constant source 16 and toward the reflective surface 23 of the mirror 13.

The reflective surface 21 is confined to a circular area substantially smaller than the diameter of the beam of light 41 emanating from the constant light source 16. The remainder of the mirror 17 is transparent to permit the passage of light from the light source 16. It will be understood that the diameter of the light source 16 must be substantially greater than that of the reflective surface 21.

The flash source 18, which may be of any conventional type, but preferably one having an enclosed housing for concentrating its light radiation in substantially one direction, is positioned opposite the reflective surface 21 of the mirror 17 and is secured to the support base at the rearward end thereof by any conventional means. The flash source 18 is provided with a light diffusion disk 31 (Figure 2). The flash source 18 has a synchronizing switch 27 which is attached to the synchronizing device 28 of the camera 10 by the electrical connection 29. The flash source 18 may be of a conventional type utilizing flash bulbs or it may be of the type commonly known as a strobe light.

In order that the beam 40 of radiation from the constant light source 16 will illuminate the object 30 for use of the view finder 19, it is necessary that such radiation be directed in a path substantially parallel to the lens axis 9. While there are numerous positions in which the mirror 13 and the light source 16 may be arranged in order to effect such parallel radiation, it has been found that a preferred arrangement is achieved when the mirror 13 is positioned at an angle of between 50 and 55 degrees to the lens axis 9. With the position of the mirror 13 thus established, the constant light source is placed so that the light radiation coming therefrom is directed to strike the reflective surface 23 of the mirror 13 at an angle of incidence equal to the angle between the lens axis 9 and the mirror 13. Thus, since the angle of incidence is equal to the angle of reflection, the light rays from the constant source 16 reflected from the mirror 13 will be parallel with the lens axis 9, and will completely surround said axis, which passes through the opening 14 in the center of the mirror 13. It will be seen that the mirror 17 and the flash source 18 can be similarly arranged, once the position of the mirror 13 is fixed, to reflect the radiation from the flash source in a direction parallel to the lens axis 9 and portions of the radiation from the constant source 16. It has been found that a preferred position for the mirror 17 is at an angle of about 15 degrees to said mirror 13. This relative angular position is particularly advantageous because it permits light from the constant source 16 to pass around the reflective surface 21 without the necessity of making the constant light source 16 excessively large in size. With the position of the mirrors 13 and 17 fixed, the flash source 18 is positioned so that the radiation therefrom will strike the mirror 17 at an angle of incidence equal to the angular disposition between the mirror 17 and the path of radiation between the constant source 16 and the first mirror 13.

It is recognized that angles of incidence and reflection can be theoretically reversed. Therefore, it will be understood that in this invention the angle of incidence must be selected so that the reflected radiation is in fact parallel with the lens axis 9. The same applies with respect to the mirror 17 and the light source 18. Reversal of this arrangement would make the unit inoperable.

*Operation*

Although my invention may be used while mounted upon a tripod or similar support, it is primarily designed to be supported by the operator. It is, therefore, desirable to have a light source of such intensity that exposures of $\frac{1}{100}$ of a second may be made to eliminate blurring due to movements of the camera.

In operation, the camera 10 is moved into position with its optical system 11 in line with the central opening 14 and with its lens axis extending therethrough. The constant light source 16 is turned on and the light therefrom, which passes around the reflective surface 21, is reflected off the mirror 13 in a direction parallel to the lens axis 9. The constant light source 16 provides a continuous light beam to be directed upon the object 30 to be photographed, whereby said object can be located in the view finder 19. The camera shutter is then opened thereby actuating the flash source 18 through the synchronizing device 28 of the camera 10 and the switch 27 on the flash source 18. Thus, the photograph is taken and the film is exposed by the radiation from the flash source reflected from the mirror 17 and the mirror 13 to illuminate the object 30. With the light from the constant source 16 directed upon the object 30, the operator may focus the camera 10. At the least, the light from the constant source 16 must be strong enough to present a clear and detailed picture in the view finder because at short range exact focusing is critical. As explained earlier, under certain circumstances, the exposure may be made without auxiliary light using the light from the constant source only. The range within which the object 30 will be properly lighted extends from the point of focus of the beam 40 to a point away from the camera 10 approximately 5 inches. The object 30 is shown at the point of focus of the beam 40 in Figure 3. This is the closest the object may be to the mirror 13, a distance of approximately 3 inches from the mirror 13, measured from the central opening 14.

When the flash source 18 is used, it is essential that the diffusion disk 31 be used for several reasons. Such a disk controls the light intensity from the flash bulb and assures a light strength of constant intensity throughout the entire area of the object 30. This disk also serves to protect the equipment and the operator should the flash bulb explode.

It will be recognized that my unit will operate when the elements thereof are arranged in positions differing from those hereinabove specifically mentioned. Therefore, it is to be understood that, although the above mentioned drawings and description apply to a particular, preferred embodiment of the invention, it it not my intent, implied or otherwise, to eliminate other variations or modifications which do not depart from the scope of the invention claimed.

I claim:

1. In a photographic unit, the combination comprising: a base plate; a camera having an optical system with an extended axis through the center thereof; means supporting said camera upon said base plate for movement parallel with said axis, said axis being parallel with said base plate; a first mirror having a central opening therethrough, said axis passing through the center of said opening; means supporting said mirror perpendicularly upon said base plate, said mirror being disposed at an angle of approximately 55 degrees to said axis and being spaced from said optical system, and the reflective surface of said mirror being remote from said camera; a first light source mounted upon said base plate to direct radiation upon the reflective surface of said mirror, the portion of said radiation reflected from said mirror being parallel with said axis; a second mirror disposed in the light path between said first light source and said first mirror and positioned at an angle of approximately 15 degrees to said first mirror, said second mirror having a central reflective surface surrounded by a transparent area; the reflective surface of the second mirror being remote from and substantially smaller than said first light source; means supporting said second mirror perpendicularly upon said base plate; and a second light source mounted upon said base plate to direct radiation upon the reflective surface of said second mirror, the portion of this radiation reflected from said second mirror being substantially parallel with the radiation from said first light source.

2. In a device for directing light radiation in a beam onto an object, said beam being parallel with the extended axis of the optical system of a camera, the combination comprising: a first mirror disposed at an angle of between 50 and 55 degrees with respect to said axis, the reflective surface of said mirror being remote from said camera; said mirror having a central opening through which said axis extends; a first light source positioned for directing light radiation upon the reflective surface of said first mirror, said radiation being reflected therefrom in a direction parallel with said axis; a second mirror positioned in the path of light radiation from said first light source and at an angle of approximately 15 degrees with respect to said first mirror, said second mirror having a central reflective surface surrounded by a transparent area; the reflective surface of said second mirror being remote from and substantially smaller than said first light source; a second light source positioned for directing light radiation upon the reflective surface of said second mirror, the reflected radiation from said second mirror impinging upon the reflective surface of said first mirror and reflecting therefrom in a direction substantially parallel with said axis.

3. In a device for directing light radiation in a beam onto an object, said beam being parallel with and entirely surrounding the extended axis of the optical system of a camera, the combination comprising: a first mirror having a reflective surface remote from said camera and disposed at an acute angle to said axis, said mirror having a central opening through which said axis extends; a first light source positioned for directing light radiation of relatively low intensity upon the reflective surface of said first mirror, said radiation being reflected therefrom in a direction parallel with said axis and away from said camera; a second mirror positioned in the path of light radiation from said first light source and having a central reflective surface surrounded by a light pervious area; said reflective surface being remote from and substantially smaller than said first light source; a second light source positioned for directing light radiation of relatively high intensity upon the reflective surface of said second mirror, the reflected radiation from said second mirror impinging upon the reflective surface of said first mirror and reflecting therefrom in a direction substantially parallel with said axis.

4. In an apparatus for directing light radiation in a path parallel to and substantially surrounding the extended axis of the optical system of a camera, the combination comprising: a first mirror having a central opening through which said axis extends, said mirror being disposed at an angle to said axis and having its reflective surface remote from said camera; a first light source positioned to direct radiation upon the reflective surface of said first mirror, the portion of said radiation reflected therefrom being parallel with said axis; a second mirror disposed between said first light source and said first mirror and disposed at an angle to said first mirror, the reflective surface of said second mirror being surrounded by a light pervious area, the reflective surface of said second mirror facing said first mirror and being substantially smaller than said first light source; and a second light source positioned to direct radiation upon the reflective surface of said second mirror, the portion of this radiation reflected from said second mirror being substantially parallel with the radiation from said first light source.

5. In an apparatus for directing light radiation in a path parallel to and substantially surrounding the extended axis of the optical system of a camera, the combination comprising: a first mirror having a central opening through which said axis extends, said mirror being disposed at an angle to said axis and having its reflective surface remote from said camera; a first light source positioned to direct radiation upon the reflective surface of said first mirror, the portion of said radiation reflected therefrom being parallel with said axis; the area of said first mirror intercepting said radiation being substantially greater than the area of said opening; a second mirror disposed between said first light source and said first mirror and disposed at an angle to said first mirror, said second mirror having a circular reflective surface surrounded by a transparent medium, said last-mentioned reflective surface being of substantially lesser area than the beam of light emanating from said first light source; the reflective surface of said second mirror facing said first mirror; and a second light source positioned to direct radiation upon the reflective surface of said second mirror, the portion of this radiation reflected from said second mirror being substantially parallel with the radiation from said first light source.

JACKSON W. BATES.

References Cited in the file of this patent

UNITED STATES PATENTS

| Number | Name | Date |
|---|---|---|
| 1,914,224 | Wallace | June 13, 1933 |
| 2,292,044 | Bucky | Aug. 4, 1942 |